United States Patent [19]

Francisco

[11] Patent Number: 5,331,262
[45] Date of Patent: Jul. 19, 1994

[54] SELF ADJUSTING MOTOR POSITIONING SYSTEM AND METHOD

[75] Inventor: Robert J. Francisco, New Fairfield, Conn.

[73] Assignee: Pitney Bowes Inc., Stamford, Conn.

[21] Appl. No.: 987,834

[22] Filed: Dec. 9, 1992

[51] Int. Cl.⁵ .............................. G05B 5/00
[52] U.S. Cl. .................. 318/452; 318/466; 318/470; 318/603; 318/652
[58] Field of Search .......... 318/603, 600–602, 318/569, 466, 468, 469–470, 449–450, 560, 561, 567, 599, 626, 652–655, 452

[56] References Cited

U.S. PATENT DOCUMENTS

| | | | |
|---|---|---|---|
| 3,843,915 | 10/1974 | Helmbold | 318/603 X |
| 3,984,744 | 10/1976 | Moody | 318/442 |
| 4,266,171 | 5/1981 | Mashimo | 318/603 X |
| 4,360,769 | 11/1982 | Selkey et al. | 318/603 X |
| 4,364,002 | 12/1982 | Suzuki et al. | 318/467 |
| 4,394,609 | 7/1983 | Janicki et al. | 318/603 X |
| 4,469,993 | 8/1984 | Swanson et al. | 318/603 X |
| 4,928,807 | 5/1990 | Auerbach | 198/379 |
| 5,021,781 | 6/1991 | Salazar et al. | 318/603 X |
| 5,131,643 | 7/1992 | Graveson et al. | 271/2 |
| 5,154,405 | 10/1992 | Graveson et al. | 271/2 |
| 5,216,346 | 6/1993 | Murakami | 318/603 |

*Primary Examiner*—William M. Shoop, Jr.
*Assistant Examiner*—David Martin
*Attorney, Agent, or Firm*—Charles R. Malandra, Jr.; Melvin J. Scolnick

[57] ABSTRACT

A self-adjusting motor positioning system comprises a motor including a shaft extending therefrom, a disc coupled to the motor shaft and having at least first and second notches, rotating apparatus coupled to the motor shaft whereby the rotating apparatus is intermittently driven by the motor, a sensor adjacent the disc for detecting the first and second notches, and a control processor coupled to the sensor and the motor for receiving detection signals from the sensor and for turning the motor on and off. The control processor includes memory for storing a time delay count representing a time delay for the control processor to turn off the motor after the second notch is detected by the sensor. The rotating apparatus includes a starting position from which the rotating apparatus begins. The first notch in the disc corresponds to the starting position of the rotating apparatus. The control processor turns the motor off when the time delay expires after the sensor detects the second notch. The sensor senses for the first notch as the motor coasts to a stop, and the control processor adjusts the time delay count if the first notch is not detected when the disc is at a complete stop.

4 Claims, 3 Drawing Sheets

SELF ADJUSTING MOTOR POSITIONING SYSTEM AND METHOD

FIELD OF THE INVENTION

The invention disclosed herein relates generally to motor control systems, and more particularly to motor control systems controlling rotating apparatus in start and stop modes of operation.

BACKGROUND OF THE INVENTION

In motor controlled systems, a motor can be used to move mechanical components a precise distance to obtain precision movement of the components in the operation of a machine. For some machines, the motor control system operates the machine in machine cycles, and during each machine cycle, or group of machine cycles, the mechanical components perform an operation which is repeated for each cycle or group of cycles. One such operation includes the controlled movement of the mechanical components from a starting position to a stopping position, including a return to the starting position. This operation may take place during one or more machine cycles before the operation is repeated.

Typically, the motor control system must be within a certain tolerance for the operation to be performed properly. For certain applications of such motor control systems, the motor control system has an inherent tendency to exceed the desired tolerance as a result of normal wear and tear to the components. This is particularly the case for high speed operations comprising sudden, high speed or high torque movement.

An example of such high speed operations requiring controlled precision movement is found in an inserting machines including apparatus for turning flat articles, such as described in U.S. Pat. Nos. 4,928,807, 5,131,643 and 5,154,405, which are assigned to the assignee of the present invention. The turning apparatus includes means for receiving a serial stream of articles, e.g., an envelope, conveyed from an insertion station, and means for turning the envelope for further processing. It is critical that the turning mechanism be properly synchronized and aligned to ensure that after the envelope is turned 90 degrees the turning mechanism is returned to the correct starting position.

Experience has shown that repeated operation of such turning mechanisms, and other starting and stopping apparatus, causes wear and tear on the mechanical components which requires periodic mechanical adjustment and eventual replacement of the mechanical components. Generally, such adjustments and replacements are done by a qualified service technician who is trained for the particular machine.

It is an object of the present invention to provide a self-adjusting motor positioning system which automatically adjusts for normal wear and tear of the mechanical components.

It is a further object of the present invention to reduce the amount of service calls required to adjust a motor control system into tolerance.

SUMMARY OF THE INVENTION

In accordance with the present invention, a self-adjusting motor positioning system comprises a motor including a shaft extending therefrom, a disc coupled to the motor shaft and having at least first and second notches, rotating apparatus coupled to the motor shaft whereby the rotating apparatus is intermittently driven by the motor, a sensor adjacent the disc for detecting the first and second notches, and a control processor coupled to the sensor and the motor for receiving detection signals from the sensor and for turning the motor on and off. The control processor includes memory for storing a time delay count representing a time delay for the control processor to turn off the motor after the second notch is detected by the sensor. The rotating apparatus includes a starting position from which the rotating apparatus begins. The first notch in the disc corresponds to the starting position of the rotating apparatus. The control processor turns the motor off when the time delay expires after the sensor detects the second notch. The sensor senses for the first notch as the motor coasts to a stop, and the control processor adjusts the time delay count if the first notch is not detected when the disc is at a complete stop.

DETAILED DESCRIPTION OF THE PRESENT INVENTION

In accordance with the present invention, a compensation algorithm is used in combination with existing machine sensors to compensate for mechanical wear and tear of the mechanical components controlled by the motor control system. The following is a description of the preferred embodiment which is representative of the present invention. However, it will be understood that the present invention is suitable for any motor control system involving a precise starting position for a motor operating in a cyclical start/stop mode.

Figure 1:
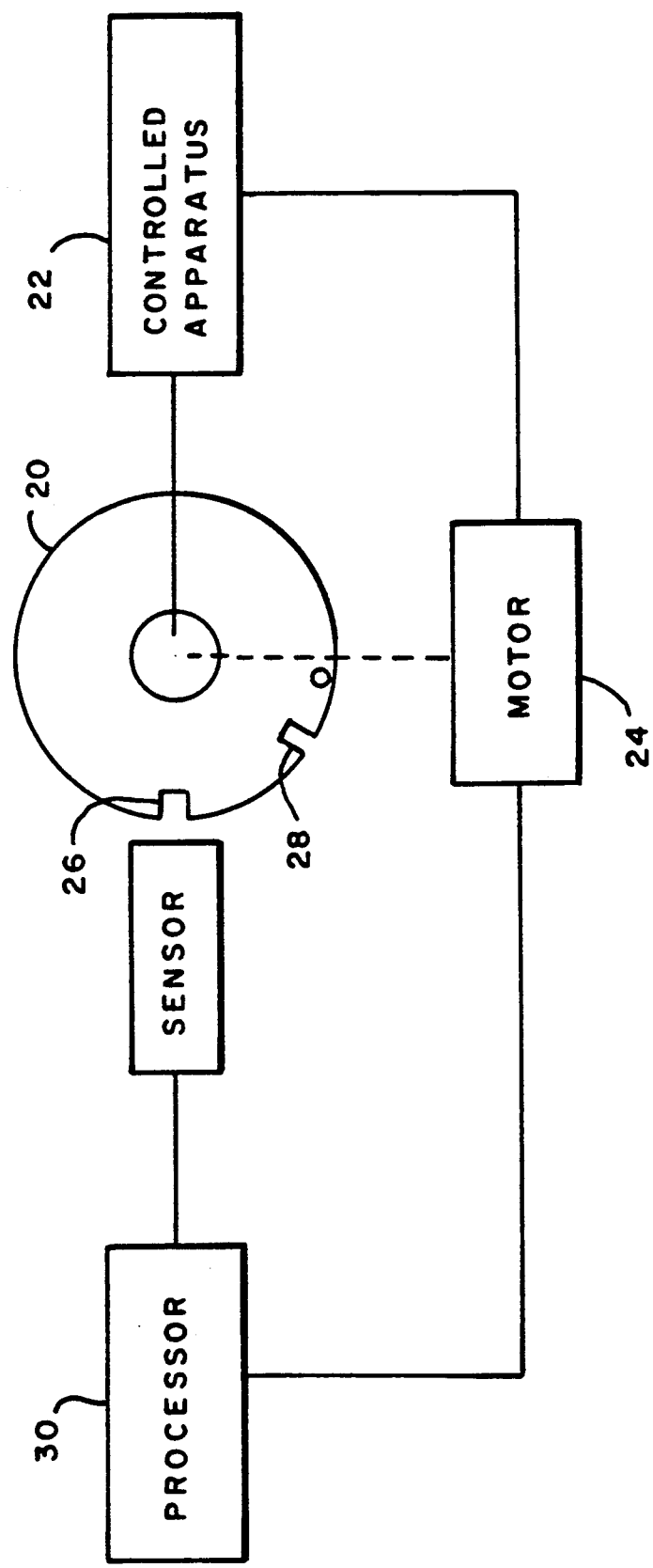
FIG. 1 is a block diagram of a motor control system embodying the present invention.

Referring now to FIG. 1, the present invention includes a synchronization disc 20 which is coupled to a motor 24. The disc may be connected directly or indirectly to the shaft of motor 24. There is an apparatus 22 which performs a mechanical operation controlled by motor 24. Disc 20 includes at least two notches 26 and 28 which are used as a home position and synchronization position respectively. The location of notch 28 relative to notch 26 depends on the inertia of the motor control system and the apparatus being controlled. Thus, the distance between notches 26 and 28 will vary accordingly.

A processor 30 is coupled to motor 24 for turning motor 24 on and off. There is a sensor 31 coupled to processor 30 for sensing notches 26 and 28 when the notches are situated adjacent sensor 31.

Figure 2:
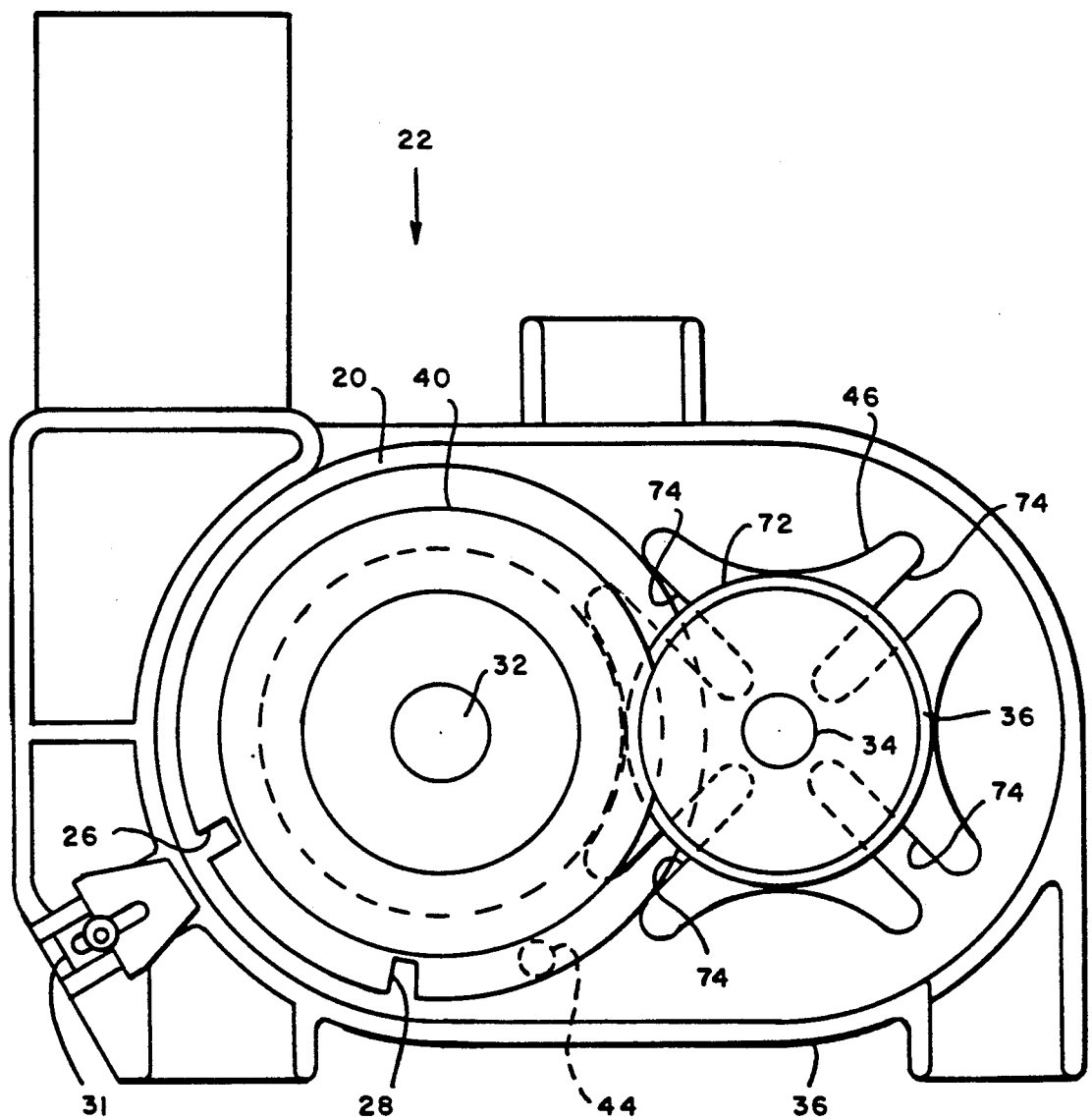
FIG. 2 is a plan view of an embodiment of the present invention with a prior art turning apparatus.
Figure 3:
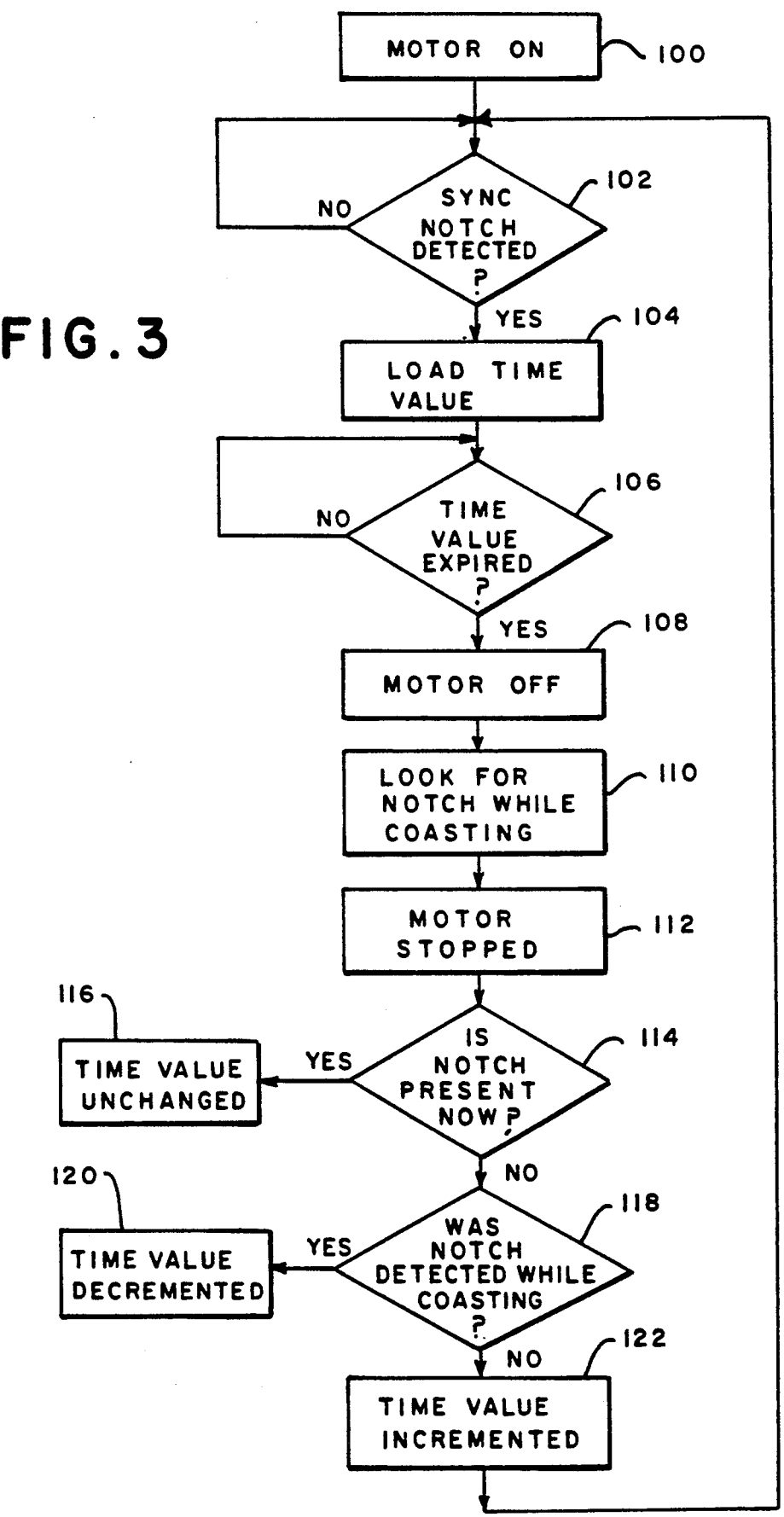
FIG. 3 is a flow chart of an algorithm of the preferred embodiment of the present invention.

Referring now to FIG. 2, an example of the preferred embodiment is shown controlling the turning apparatus 22 described in U.S. Pat. No. 4,928,807 which is incorporated herein by reference. Disc 20 is mounted on a shaft assembly 32 which drives a four function cam 40. There is a turner shaft 34 which has a geneva gear 46 and a cam follower 72 mounted thereon. Cam follower 72 follows a race (not shown) in cam 40. Thus, shaft assembly 32 lifts turner shaft 34 for the purpose of turning an envelope which is stopped and engaged above turner shaft 34. There is a pin 44 on cam 40 which engages slots 74 of geneva gear 46, which controls the rotation of turner shaft 34. As is well known pin 44 enters a slot 74 and thereby engages shaft 34 to rotate it 90 degrees in the case of four slots until it withdraws from the first slot 74 and on the next cycle of shaft 32, pin 44 engages a second slot 74 to again rotate shaft 32 90 degrees, and so on. In such a manner, turning apparatus 22 rotates envelopes 90 degrees.

In operation, the disc rotates in a counterclockwise direction, as shown in FIG. 2. When notch 28 is detected by notch sensor 31, the control system will wait the number of counts contained in a software controlled time delay count. The time delay count is a variable software controlled integer count which is used by the motor control system software to determine the precise moment when the motor must be turned off. When the motor is turned off, the motor coasts down to a stop. It will be understood, that the length of coast down time depends on the size and speed of the motor and the inertia of the system. During this coast down time, the motor control system software monitors the disc for notch 26. If notch 26 is not detected, i.e., the disc does not rotate enough for notch sensor to detect notch 26, then the time delay count is incremented. If notch 26 is detected and then lost, i.e., the disc rotated notch 26 past notch sensor 31, then the time delay count is decremented. It is noted that the granularity of the time units in the time delay count will vary depending on the inertia of the system.

Referring now to FIG. 2, a flow chart of an algorithm of the preferred embodiment of the present invention is shown. At 100, the motor is turned on and, at 102, the system looks for the synchronization notch. When the synchronization notch is detected the time delay count is loaded into a time counter software location, at 104, where it is then decremented, at 106, until the counter is zero indicating the time delay has expired, and the motor is turned off, at 108. As previously noted, when the motor is turned off, the system is coasting to a stop. At 110, the system looks for home position notch 26 while the system is coasting. At 112, the motor is at a complete stop and the system determines, at 114, if notch 26 is detected at the location where the motor stopped. If notch 26 is detected, then, at 116, the time delay count remains unchanged because the system is still within the required tolerance. However, if notch 26 is not detected at the location of the stopped motor, then, at 118, the system checks if notch 26 was detected while the motor was coasting to a stop. If it was detected, at 120, the time delay value is decremented so that the motor will be turned off at one less count. If notch 26 was not detected during coasting, then, at 122, the time delay value is incremented so that the next cycle the motor turn off will be delayed one additional count.

It will be understood that each increment or decrement of the time delay count will result in a minute adjustment of the motor control system which will not be observable, but which will allow the apparatus to continue operation without requiring servicing for maintaining tolerance.

While the present invention has been disclosed and described with reference to a single embodiment thereof, it will be apparent, as noted above that variations and modifications may be made therein. It is, thus, intended in the following claims to plate each variation and modification that falls within the true spirit and scope of the present invention.

What is claimed is:

1. A self-adjusting motor positioning system, comprising:
   a motor including a shaft extending therefrom;
   a disc coupled to said motor shaft and having at least first and second notches;
   rotating apparatus coupled to said motor shaft whereby said rotating apparatus is intermittently driven by said motor, said rotating apparatus having a desired starting position from which the rotating apparatus is desired to begin turning, said first notch in said disc corresponding to said starting position of said rotating apparatus;
   sensor means adjacent said disc for detecting said first and second notches;
   control processing means coupled to said sensor means and said motor for receiving detection signals from said sensor means and for turning said motor on and off, said control processing means including memory means for storing a time delay count representing a time delay for said control processing means to turn off said motor after said second notch is detected by said sensor means;
   wherein said control processing means turns said motor off when the time delay expires after said sensor means detects said second notch, said control processing means determining whether said sensor means has detected said first notch as said motor coasts to a stop, and said control processing means decrements said time delay count if said sensing means detected said first notch while said motor coasts to a stop.

2. The system according to claim 1 wherein said control processing means increments said time delay count if said sensing means has not detected said first notch by the time said motor has coasted to a stop.

3. The system according to claim 2 wherein said control processing means increments said time delay count stored in said memory means if said sensing means does not detect said first notch while said motor coasts to a stop or when said motor is stopped.

4. The method of automatically adjusting a motor position for a motor controlling a rotating apparatus coupled to a drive shaft of the motor, composing the steps of:
   (a) turning said motor on;
   (b) storing a time delay count in memory of a motor control processor;
   (c) detecting a first notch in a synchronizing disc coupled to the drive shaft of the motor;
   (d) decrementing the stored time delay count to zero when said first notch is detected;
   (e) turning said motor off when the stored time delay count reaches zero and begin detection of a second notch on said synchronizing disc;
   (f) incrementing said time delay count when said second notch is detected before said motor coasts to a stop and returning to step b;
   (g) decrementing said time delay count when said second notch is not detected by the time said motor comes to a complete stop and returning to step b.

* * * * *